UNITED STATES PATENT OFFICE.

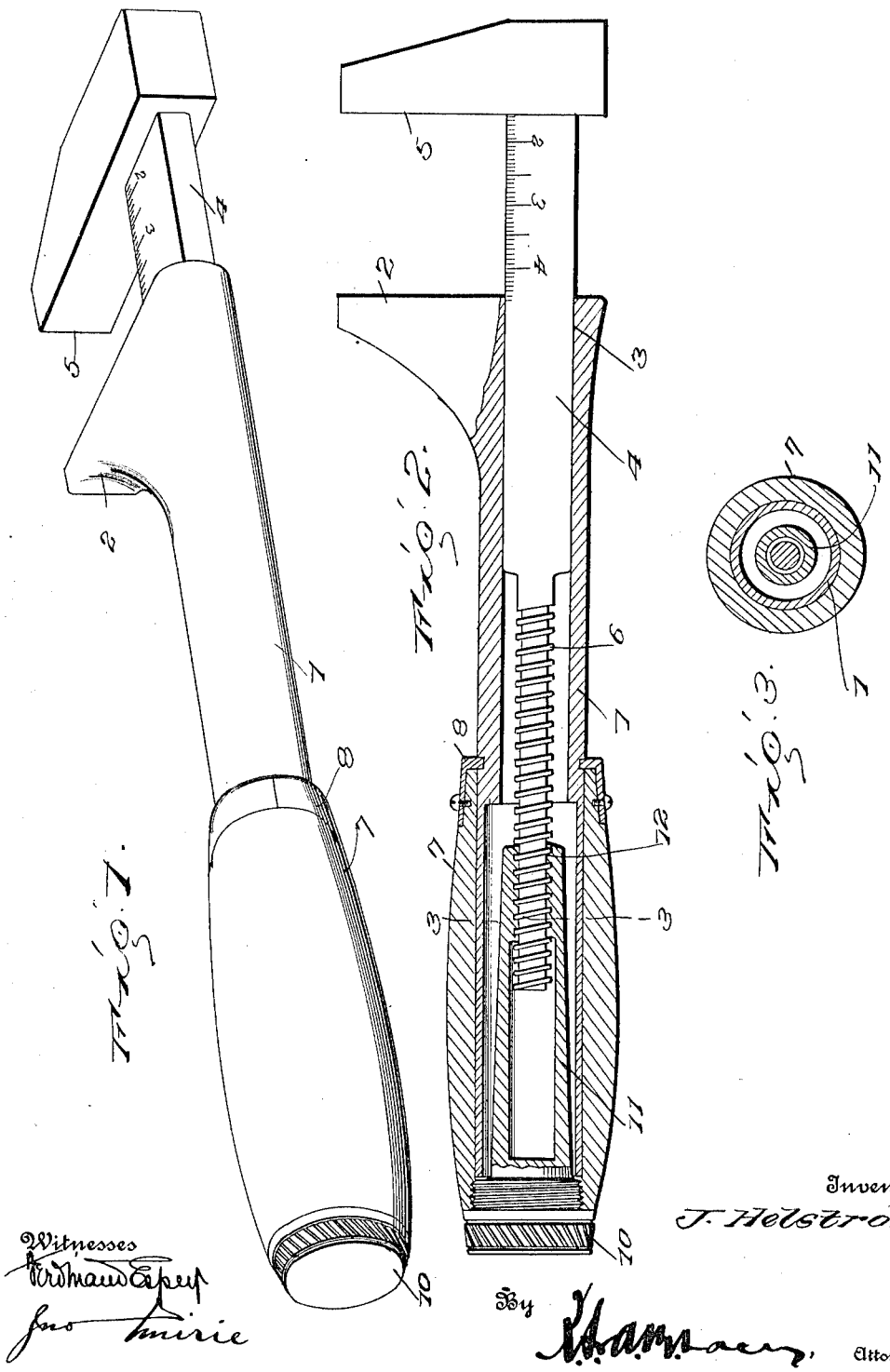

JOHN HELSTROM, OF MORRISTOWN, NEW JERSEY.

WRENCH.

1,040,673.  Specification of Letters Patent.  Patented Oct. 8, 1912.

Application filed April 19, 1912.  Serial No. 691,885.

*To all whom it may concern:*

Be it known that I, JOHN HELSTROM, citizen of the United States, residing at Morristown, in the county of Morris and State of New Jersey, have invented certain new and useful Improvements in Wrenches, of which the following is a specification.

This invention has relation to wrenches and has for its object to provide a wrench of simple structure, the parts of which are so assembled that the jaws will positively retain their positions with relation to each other after they have been set or adjusted.

With this object in view, the wrench includes a handle member having a jaw fixed at one end. The shank is slidably mounted in the handle member and is provided with a jaw which, when the shank is moved, is adapted to shift with relation to the first mentioned jaw. A grip is journaled upon the handle member, and a nut is screw-threaded in the grip and is provided with a sleeve having a threaded collar which engages the thread provided upon the said shank. Means is provided for preventing the grip from moving longitudinally with relation to the handle member. Also means is provided for preventing the shank from rotating with relation to the handle member.

For a full understanding of the invention and the merits thereof, reference is to be had to the following description and accompanying drawings, in which:

Figure 1 is a perspective view of the wrench; Fig. 2 is a longitudinal sectional view of the same; Fig. 3 is a transverse sectional view of the same cut on the line 3—3 of Fig. 2.

Corresponding and like parts are referred to in the following description and indicated in all the views of the drawing by the same reference characters.

As illustrated in the accompanying drawing, the wrench includes a handle member 1 which is hollow throughout its length and which is provided at one end with a fixed jaw 2. The opening through the handle member 1 in the vicinity of the jaw 2 is angular or non-circular as at 3. A non-circular shank 4 fits snugly in the non-circular portion 3 of the opening through the handle member 1 and is arranged to slide with relation to the handle member 1. This shank is provided at its outer end with a jaw 5. The jaws 2 and 5 are juxtaposed with relation to each other. The shank 4 is provided at its inner end with a thread 6. A grip 7 is journaled upon the handle member 1 and is provided at its end nearest the jaw 2 with a ferrule or flange 8, the edge of which is located in a groove 9 provided upon the handle member 1. This ferrule holds the grip 7 against movement longitudinally along the handle member 1, but permits the grip to be rotated upon the handle member 1. A nut 10 is screw-threaded into the end of the grip 7 which is remote from the jaw 2 and the said nut is provided with a sleeve 11 which is screw-threaded internally as at 12.

The thread 12 of the sleeve engages the thread 6 upon the shank 4. Therefore, it will be seen that when the grip 7 is rotated upon the shank 4, the nut 10 is carried around with the same and by reason of the engagement of the threads 12 and 6, the shank 4 and the jaw 5 are shifted with relation to the handle member 1 and the jaw 2. By such an arrangement, it is an easy matter to control the shiftable jaw with relation to the fixed jaw upon the handle member and thus the said jaws may be held in close contact with the sides of the nut which is received between them and therefore in the use of the wrench it is not likely that the corners of the nut will be broken or mutilated by reason of the spreading of the jaws during the operation of turning the nut.

Having thus described the invention, what is claimed as new is:

A wrench comprising a handle member having a jaw, said handle member being provided with an opening extending through the length of the same, a shank slidably mounted in said opening and restrained against rotation therein, a head carried by said shank, said handle member having a groove, a grip journaled upon the handle member, a ferrule mounted upon the grip and having an edge portion located in said groove, and a nut fixed to the grip and having a threaded sleeve which engages the thread upon the shank.

In testimony whereof I affix my signature in presence of two witnesses.

JOHN HELSTROM. [L. S.]

Witnesses:
　Andrew Bohm,
　Christian Thompson.

Copies of this patent may be obtained for five cents each, by addressing the "Commissioner of Patents, Washington, D. C."